US012580458B2

(12) United States Patent
Sathyanarayan et al.

(10) Patent No.: US 12,580,458 B2
(45) Date of Patent: Mar. 17, 2026

(54) DETERMINING RELIABILITY OF AN ELECTRICAL MACHINE

(71) Applicant: ROLLS-ROYCE plc, London (GB)

(72) Inventors: Rajaram Sathyanarayan, Singapore (SG); Sivakumar Nadarajan, Singapore (SG); Viswanathan Vaiyapuri, Singapore (SG); Srikanth Narasimalu, Singapore (SG); Amit K Gupta, Singapore (SG)

(73) Assignee: ROLLS-ROYCE PLC, London (GB)

( * ) Notice: Subject to any disclaimer, the term of this patent is extended or adjusted under 35 U.S.C. 154(b) by 157 days.

(21) Appl. No.: 18/542,934

(22) Filed: Dec. 18, 2023

(65) Prior Publication Data

US 2024/0204628 A1    Jun. 20, 2024

(30) Foreign Application Priority Data

Dec. 20, 2022    (GB) ...................................... 2219248

(51) Int. Cl.
| | |
|---|---|
| *H02K 11/35* | (2016.01) |
| *H02K 11/26* | (2016.01) |
| *H02K 11/27* | (2016.01) |

(52) U.S. Cl.
CPC ............. *H02K 11/35* (2016.01); *H02K 11/26* (2016.01); *H02K 11/27* (2016.01)

(58) Field of Classification Search
CPC ........... G05B 23/0283; G05B 23/0232; G05B 23/0289; H02P 6/12
See application file for complete search history.

(56) References Cited

U.S. PATENT DOCUMENTS

| | | | |
|---|---|---|---|
| 4,525,763 A | 6/1985 | Hardy et al. | |
| 7,769,552 B2 * | 8/2010 | Colby | H02P 23/14 |
| | | | 702/65 |
| 8,248,739 B2 | 8/2012 | Farr | |
| 10,371,583 B1 * | 8/2019 | Pan | G01K 7/42 |
| 10,753,976 B2 | 8/2020 | Finney et al. | |
| 2004/0044499 A1 | 3/2004 | House et al. | |
| 2009/0027074 A1 * | 1/2009 | Ko | H01L 22/34 |
| | | | 257/E21.531 |
| 2011/0019318 A1 * | 1/2011 | Farr | G01R 31/343 |
| | | | 361/24 |

(Continued)

FOREIGN PATENT DOCUMENTS

| | | |
|---|---|---|
| JP | 2020-008472 A | 1/2020 |

OTHER PUBLICATIONS

Vintr et al., "As Assessment of Mean Time Between Failures for a Group of Rolling Bearings," IEEE, retrieved online Nov. 15, 2023 from IEEE Xplore.

(Continued)

*Primary Examiner* — Huy Q Phan
*Assistant Examiner* — Temilade S Rhodes-Vivour
(74) *Attorney, Agent, or Firm* — OLIFF PLC.

(57) ABSTRACT

A computer-implemented method of determining a value of a reliability parameter of an electrical machine, the method includes: estimating an operating temperature of at least a part of the electrical machine based on a measure of a current drawn or supplied by the electrical machine; and determining the value of the reliability parameter based on the estimated operating temperature.

15 Claims, 6 Drawing Sheets

100

(56) References Cited

U.S. PATENT DOCUMENTS

2011/0050141 A1 * 3/2011 Yeh ....................... H02P 29/664
318/434
2016/0377488 A1 * 12/2016 Sjoroos .................... G01K 7/00
374/163

OTHER PUBLICATIONS

May 22, 2023 Combined Search and Examination Report issued in British Application No. 2219248.8.
May 31, 2024 Extended European Search Report Issued in European Patent Application No. 23211377.9.
Gökdere et al., "Adaptive Control of Actuator Lifetime," IEEE Aerospace Conference, 2006.

* cited by examiner

Figure 1:
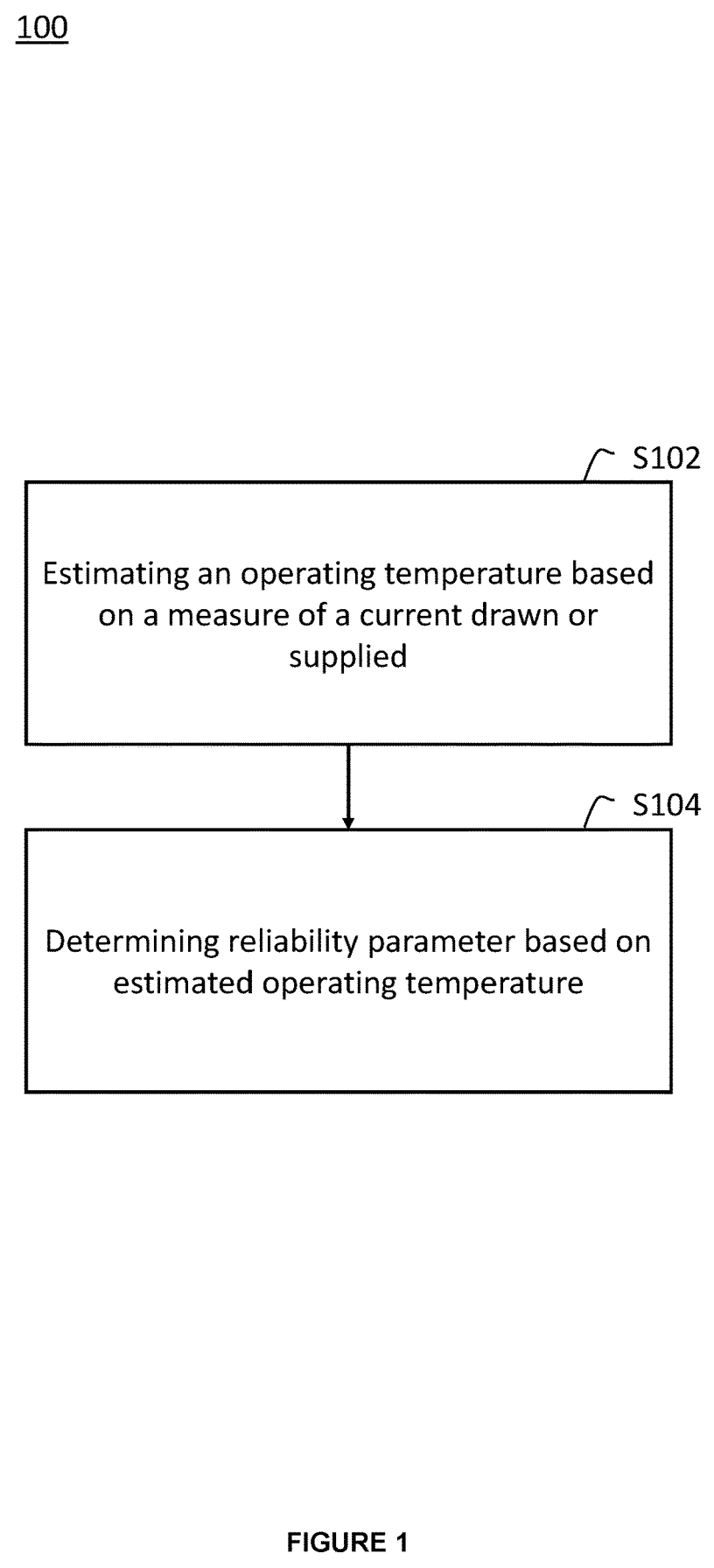

100

⌐ S102

Estimating an operating temperature based on a measure of a current drawn or supplied

⌐ S104

Determining reliability parameter based on estimated operating temperature

Reliability-Determination Apparatus

Electrical machine

External system

1000

DETERMINING RELIABILITY OF AN ELECTRICAL MACHINE

This specification is based upon and claims the benefit of priority from UK Patent Application Number 2219248.8 filed on 20 Dec. 2022, the entire contents of which are incorporated herein by reference.

BACKGROUND

Field of the Disclosure

This disclosure relates to techniques for determining a value of a reliability parameter of an electrical machine, and associated methods, apparatuses, computer programs and storage media.

Background of the Disclosure

Electrical machines are commonplace, for example in the aerospace industry, and reliable operation of such electrical machines can be critical for overall system safety. Electrical machines used in aerospace applications are often designed to run in harsh environments, where the machines may be exposed to high electrical, thermal, and mechanical stresses. It is therefore important to ensure the reliability and availability of electrical machines in e.g., power and propulsion systems, where safety of a pilot or operator and passengers are paramount.

Many reliability parameters exist which can be used to determine a measure of reliability of a system, such as an expected lifetime or probability of failure. Reliability parameters may be used for determining the maintenance needs of the system, and may assist in improving the reliability and availability of such systems if failures can be anticipated. Other examples of reliability parameters include the Mean Time Between Failure (MBTF), Mean Time To Failure (MTTF), and expected up-time.

Traditional methods of determining MTBF include the installation of thermocouples to determine the temperature of certain parts of the electrical machine. The MTBF may be estimated based on historical data or accelerated aging data. However, such an implementation requires the installation of additional sensors (which is not always feasible) and relies on large databases of previously gathered data. Calculations involving these large databases may be computationally expensive and time consuming, and may involve significant complexity. Additionally, since the thermocouple may be placed in a particularly hot or cool region of the winding, the MTBF may be over- or under-predicted.

Traditional methods may also include determining reliability and remaining time before failure for electric motor systems using an ascertained statistical confidence based on continually monitored system parameters, a database comprising historical failure mode/cause, and repair data. Since historical repair data is required, a large database is also required.

Other traditional methods characterize the reliability of rolling bearings by MTTF, or the so-called basic life rating. The model enables a determination of the bearings' reliability and can specify the number of failures that might be expected from the group during a given operating time. However, such a method makes use of specific standard rated life equations related to the parts concerned (i.e., bearings), and are not generalized for other types of failures.

It is desirable to devise improved methods of determining reliability parameters of electrical machines, and associated apparatuses, computer programs and storage media.

SUMMARY OF THE DISCLOSURE

In a first arrangement, there is provided a computer-implemented method of determining a value of a reliability parameter of an electrical machine. The method comprises estimating an operating temperature of at least a part of the electrical machine based on a measure of a current drawn or supplied by the electrical machine, and determining the value of the reliability parameter based on the estimated operating temperature.

The reliability parameter may be a mean time between failure, MTBF, or a mean time to failure, MTTF, or an expected up-time, or an expected lifetime.

The electrical machine may be a rotating electrical machine, and may be a motor or generator.

The current may be drawn or supplied by a winding of the electrical machine. The operating temperature may be the temperature of a winding of the electrical machine.

The method may comprise measuring the current, and using the measured current as the measure of the current, or deriving the current based on a measure of an impedance of the electrical machine and a potential difference or voltage across the impedance. The method may comprise measuring said potential difference, or voltage or measuring said impedance, or acquiring a known value of said impedance.

The method may comprise determining one or more power losses of at least a part of the electrical machine, and/or determining a rate of dissipated heat, being a rate of heat dissipated by at least a part of the electrical machine.

The method may comprise estimating the operating temperature based on the one or more power losses and/or the rate of dissipated heat. The method may comprise determining the one or more power losses based on the measure of the current, and/or the one or more power losses may comprise at least one of a resistive loss, such as a winding loss, and a magnetic loss, such as a core loss.

Estimating the operating temperature may be based on a difference between the one or more power losses of the electrical machine and the rate of dissipated heat.

The method may comprise successively estimating the operating temperature, each successive estimate of the operating temperature comprising a sum of the preceding estimate of the operating temperature and an estimate of a change in the operating temperature since the preceding estimate of the operating temperature.

The method may comprise estimating the change in the operating temperature since the preceding estimate of the operating temperature based on the one or more determined power losses and/or the determined rate of dissipated heat, and may be based on a difference between the one or more power losses of the electrical machine and the rate of dissipated heat.

The method may comprise determining the one or more power losses may be based on a frequency spectrum of the measure of the current. The method may comprise calculating the frequency spectrum based on the measure of the current, which may be performed by using a Fourier transform, and which may use an FFT method.

The method may comprise determining the one or more power losses may be based on at least one harmonic frequency, fundamental frequency or characteristic fault frequency in the frequency spectrum and/or a magnitude of the frequency spectrum at the at least one harmonic frequency, fundamental frequency or characteristic fault frequency. The method may comprise analyzing the frequency spectrum to identify the at least one harmonic frequency, fundamental frequency or characteristic fault frequency.

The method may comprise determining the rate of dissipated heat based on a temperature of a stator surface of the electrical machine and an existing estimate of the operating temperature.

The method may comprise determining the value of the reliability parameter using the estimated operating temperature as an input to a temperature-based model of the electrical machine which defines the reliability parameter as a function of the estimated operating temperature. The temperature-based model may be an Arrhenius model.

The method may comprise determining a first value of the reliability parameter using the estimated operating temperature as an input to the temperature-based model with the electrical machine operating at a given operating power level, such as a rated power level. The method may comprise employing the first value of the reliability parameter, the given power level, and a power-based model of the electrical machine, which defines the reliability parameter as a function of the operating power level and a constant, to derive a value of the constant. The method may comprise employing the power-based model, the derived value of the constant and a different operating power level to derive a second value of the reliability parameter corresponding to that different operating power level.

The electrical machine may have a multiphase winding. The method may comprise estimating the operating temperature and determining the value of the reliability parameter per winding phase and/or for a combination of two or more of the winding phases. For each winding phase or combination of winding phases, the measure of the current may be a measure of the current drawn or supplied by that winding phase or combination of winding phases.

In a second arrangement, there is provided a reliability-determination apparatus for determining a value of a reliability parameter of an electrical machine. The apparatus is configured to receive a measure of a current drawn or supplied by the electrical machine, and carry out the method according to the first arrangement.

In a third arrangement, there is provided a computer program which, when executed on a computer of reliability-determination apparatus, causes the reliability-determination apparatus to carry out the method of the first arrangement.

In a fourth arrangement, there is provided a computer-readable medium having the computer program of the third arrangement stored thereon.

Determining a value of a reliability parameter, an estimated MTBF, and/or other EHM (Equipment Health Monitoring) parameters, as in the arrangements above, may increase the accuracy of system health monitoring and aid in designing an ideal maintenance scheme for different use cases.

Since a measure of temperature may be determined based on a measure of current drawn or supplied by an electrical machine, the above-described disadvantages relating to the physical placement of a thermocouple (or other temperature sensor) and/or adhering to space or weight constraints in select applications, may be overcome. The method may be said to determine an average temperature of the electrical machine through consideration of the measure of current drawn or supplied by the electrical machine (as opposed to only the temperature of the region in which a thermocouple is placed), which may lead to a more accurate or more representative determination of the reliability parameter.

The estimation of e.g. MTBF may be used in conjunction with other measures of health (i.e., the health of mechanical components such as bearings, rotors, shafts) to offer holistic health monitoring solutions for electrical machines.

BRIEF DESCRIPTION OF THE DRAWINGS

The present invention is described, by way of example only, with reference to the following drawings, in which:

FIG. 1 is a flow diagram showing the steps of a method of determining a value of a reliability parameter of an electrical machine;

DETAILED DESCRIPTION OF THE DISCLOSURE

Figure 2A:
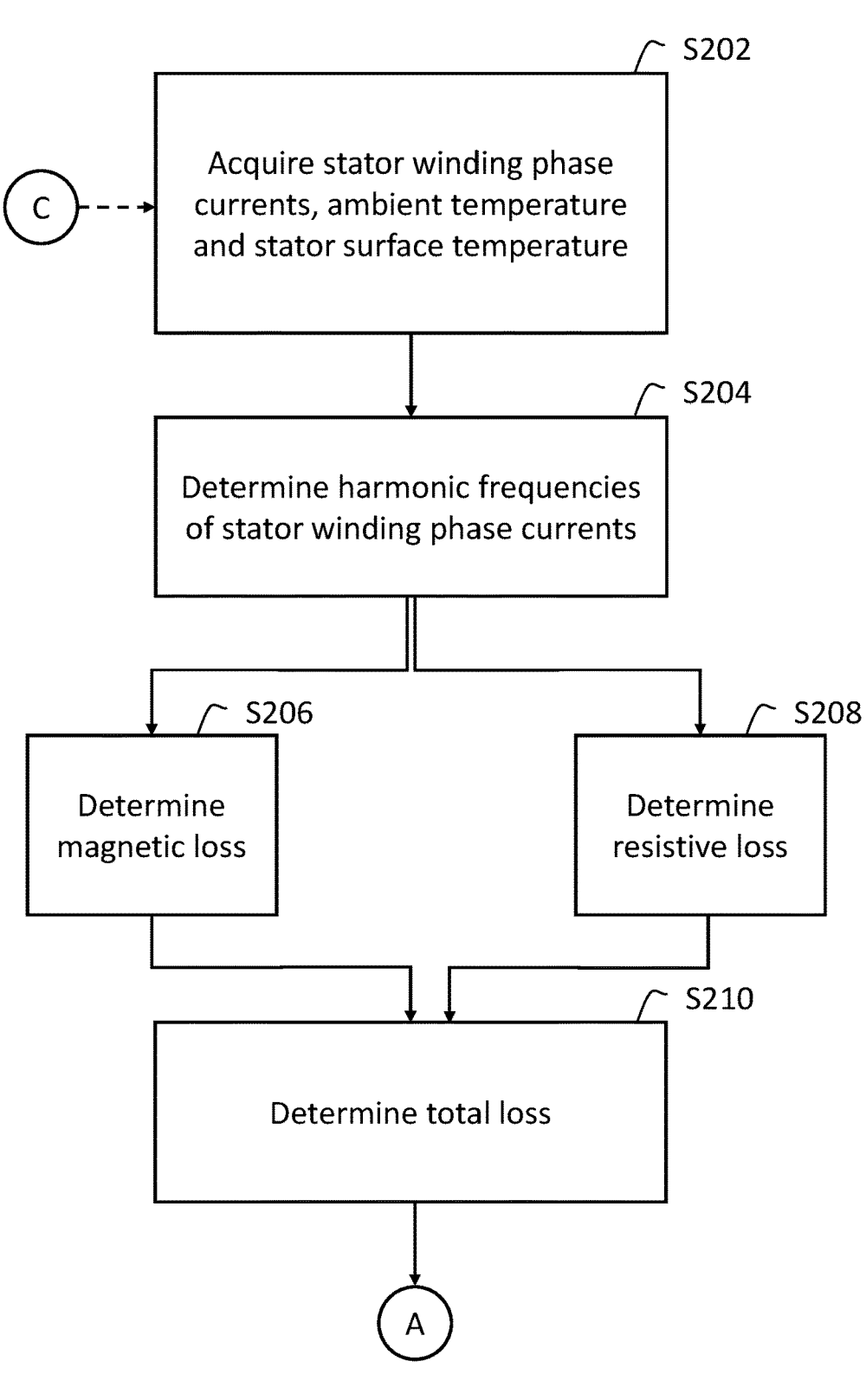
FIGS. 2A to 2C together present a flow diagram of another method of determining a value of a reliability parameter of an electrical machine.

Electrical machines in aerospace applications typically have space and weight constraints. The addition of sensors for Equipment Health Monitoring (EHM) is often not acceptable in the light of the above constraints, hence a different approach is required to estimate reliability parameters of electrical machines in aerospace applications without additional sensors, or which leverage existing sensor data.

While the necessity for deriving improved methods of determining a value of a reliability parameter of an electrical machine has been established from considerations of constraints of the aerospace industry, the methods described herein may equally be applied to other systems in, for example, the marine and automotive industries, as well as power systems in general.

This disclosure relates generally to methods of determining a value of a reliability parameter based on an estimation of temperature of an electrical machine. Firstly, a temperature is estimated based on the operating parameters of the electrical machine through available (i.e. existing) sensors or known, or pre-measured, electrical properties. Secondly, the estimated temperature is used to estimate the reliability parameter.

In a specific example described in more detail later, the electrical machine is a motor, and a stator winding temperature is estimated based on losses in the motor through available current sensors and a known winding resistance. The stator winding temperature is then used to estimate a value of MTBF by using an Arrhenius model (as an example temperature-based model), which then enables use of an inverse power model (a power-based model) to estimate another value of MTBF. The Arrhenius model is used to evaluate the impact of the temperature change or thermal stress of the stator winding on MTBF. The inverse power model enables the impact of electrical stress (electrical load/change in the operating conditions) to be considered.

More generally, FIG. 1 is a flow chart showing the steps of a method 100 of determining a value of a reliability parameter of an electrical machine.

Method 100 comprises estimating an operating temperature of at least a part of the electrical machine based on a measure of a current drawn or supplied by the electrical machine, at step S102, and determining the value of the reliability parameter based on the estimated operating temperature, at step S104.

Focusing first on step S102, the operating temperature may be the temperature of at least a part of the electrical machine during operation, and may be the temperature (e.g. an average or representative temperature) of a specific part of the electrical machine, or temperature of a group of parts of the electrical machine. The operating temperature may be the temperature of, for example, a winding (or multiple windings) of the electrical machine, where the machine is a motor or generator.

The reliability parameter may be, or be based on, a Mean Time Between Failure/s, MTBF, or a Mean Time To Failure, MTTF. MTBF is a prediction of elapsed time between failures of the machine during normal operation and can be estimated as an average (mean) time between failures which require the machine to be repaired. MTTF is a prediction of time to failure of a machine, typically which cannot be repaired.

The reliability parameter may be an expected up-time (i.e., an expected amount of time before the machine requires repair) where the machine can be repaired, or an expected lifetime (i.e., an expected amount of time before the machine breaks) where the machine cannot be repaired.

The electrical machine may be a rotating electrical machine, and may be, for example, an (electrical) motor, an (electrical) generator, a motor-generator, a rotary transformer, an induction machine or a permanent magnet machine. One type of AC motor/generator may be a permanent magnet machine. Taking a motor as an example, the motor may be a DC or AC motor. A DC motor may be a brushless or brushed motor. An AC motor may be a synchronous or asynchronous (induction) motor. An asynchronous motor may be a single phase or multi-phase motor, and may be, as specific examples, a 6-phase or 12-phase machine designed for and used in UAM (Urban Air Mobility) and CAP (Commuter Aircraft Program). A winding of the electrical machine may be a wire wrapped around a metal core or stator designed to induce or interact with a magnetic field, and may be used in a motor or generator.

The electrical machine may be employed in a system or sub-system, such as an engine, a pump or a power supply. The engine, pump and power supply may be an engine, pump and power supply of an aircraft or other vehicle. The pump may be used to circulate hydraulic fluid within components of the aircraft. The engine may be a turbine engine, or any engine including a motor or generator. The power supply may be used to power auxiliary components of an aircraft, or of an aircraft engine, for example before engine startup. The present teaching may be applicable to any engine that encompasses a motor/generator in its propulsion system.

The estimation of the operating temperature of at least a part of the electrical machine is based on a measure of a current drawn or supplied by that electrical machine. The current may be a current drawn by a winding (or multiple windings) of the electrical machine, for example where the electrical machine is a motor.

In one example, the measure of current may be an actual measured current, wherein the current is determined by measuring the current drawn or supplied by the electrical machine using, for example, an (existing) current sensor. In another example, the measure of current may be a derived current, and may involve deriving the current based on a measure of an impedance of the electrical machine and a potential difference or voltage across the impedance. The method may comprise measuring said potential difference or voltage using an (existing) voltage sensor, measuring said impedance using an (existing) sensor, or acquiring a known value of said impedance from, for example, a database or memory. The rated voltage and rated impedance of the electrical machine may be specified by the manufacturer of the machine, and so the rated values may be known and used in the derivation of the current drawn.

The potential difference or voltage may be a potential difference or voltage across the at least part of the electrical machine and may be the potential difference or voltage across one or more windings of a motor.

The estimation of the operating temperature of at least a part of the electrical machine may be based on one or more losses of at least a part of the electrical machine. One or more power losses may be determined for at least a part of the electrical machine. One or more power losses may be determined based on the measure of the current drawn or supplied.

The one or more power losses may comprise at least one of a resistive loss and a magnetic loss. The resistive loss may be a winding loss, or copper loss, and may describe the (resistive) losses in wires used as windings in a motor or generator. The magnetic loss may be a core loss, or an iron loss, and may describe the losses caused by eddy currents within a core of a motor or generator.

In examples where the electrical machine does not exhibit significant resistive losses, only magnetic losses may be determined. In examples where the electrical machine does not exhibit significant magnetic losses, only resistive losses may be determined.

A rate of dissipated heat may also be determined, being a rate of heat dissipated by at least a part of the electrical machine (such as a winding or combination of windings) to the surrounding environment or other apparatus.

Estimation of the operating temperature may be based on the one or more power losses and/or the rate of dissipated heat, and may comprise estimating the operating temperature based on a difference between the one or more power losses of the electrical machine and the rate of dissipated heat.

The one or more power losses may be calculated based on a frequency spectrum of the measure of the current. The frequency spectrum may be calculated based on the measure of the current, optionally by Fourier transform and optionally using an FFT method. The one or more power losses may be determined based on at least one harmonic frequency, fundamental frequency or characteristic fault frequency in the frequency spectrum and/or a magnitude of the frequency spectrum at the at least one harmonic frequency or characteristic fault frequency.

The at least one harmonic frequency, fundamental frequency or characteristic fault frequency may be attributed to a particular type of fault within the electrical machine, and a reliability parameter based on the particular type of fault may be desirable, and so a measure of current at this harmonic frequency may be selected. Examples of faults may include a turn-to-turn short circuit fault or failure, a short circuit fault or failure, a gear or gearbox failure, and bearing faults or failures. Harmonic frequencies may also be attributed to engine/motor/generator misalignments, wear, imbalance, eccentricity, stator looseness, or winding faults.

The frequency spectrum may be analyzed to identify the at least one harmonic frequency, fundamental frequency or characteristic fault frequency (or, more generally, a frequency of interest), and the at least one harmonic frequency, fundamental frequency or characteristic fault frequency may be used as the basis of the reliability parameter determination. The identification of the at least one harmonic frequency, fundamental frequency or characteristic fault frequency may be performed manually by a user, or computationally using an analysis method. The at least one harmonic frequency, fundamental frequency or characteristic fault frequency may be pre-known in some applications.

The operating temperature may be successively (or iteratively) estimated, where each successive estimate of the operating temperature comprises a sum of the preceding estimate of the operating temperature and an estimate of a change in the operating temperature since the preceding estimate of the operating temperature. This allows for the temperature of at least a part of the electrical machine to be updated or tracked over time and provides an accurate estimation of temperature by accounting for changes to the temperature since the preceding estimate. Successively estimating the operating temperature may allow for the temperature to be monitored during a particular time period, and may relate to start-up of the electrical machine, or a period of continuous operation of the electrical machine.

The change in the operating temperature since the preceding estimate of the operating temperature may be estimated based on the one or more determined power losses (as explained above) and/or the determined rate of dissipated heat, for example based on a difference between the one or more power losses of the electrical machine and the rate of dissipated heat (as also explained above).

Focusing second on step S104, the value of the reliability parameter may be determined using the estimated operating temperature as an input to a temperature-based model of the electrical machine (defined by an equation or formula) which defines the reliability parameter as a function of the estimated operating temperature. The model may be an Arrhenius model. For example, the temperature-based model (or equation) may have an exponent based on an activation energy, the Boltzmann constant and the estimated operating temperature. An Arrhenius model typically defines (by a formula or equation) the temperature dependence of reaction rates, and may be used in this context to indicate a relationship between reliability (electrical machine failures, or failure rates) and temperature.

In some arrangements, the method may involve determining a first value of the reliability parameter using the estimated operating temperature as an input to the temperature-based model with the electrical machine operating at a given operating power level, such as a rated power level. Then, the first value of the reliability parameter, the given power level, and a power-based model of the electrical machine (which power-based model defines the reliability parameter as a function of the operating power level and a constant) may be employed to derive a value of the constant. The power-based model, the derived value of the constant and a different operating power level may then be employed to derive a second value of the reliability parameter corresponding to that different operating power level. In this way, the effect of electrical stress on reliability may be analysed.

In some arrangements, MTBF could be calculated/determined based on a temperature-based model (e.g., Arrhenius equation) for the rated condition and with this MTBF a value for the above-mentioned constant determined for the rated condition. Next, when the operating conditions change, the current signal changes accordingly and the effect of a change in operating conditions may be taken into account in the temperature-based model (e.g., Arrhenius equation) through measured current. Then, the change in load/power level may be directly incorporated in the power-based model (e.g., an inverse power model)—using the determined constant. The overall MTBF may then be considered a product or combination of MTBF from the temperature-based model and the power-based model.

The electrical machine may have a single-phase winding, where the winding has only one phase and only one winding phase current is acquired as the measure of the current drawn or supplied. However, the electrical machine may have a multiphase winding (with a plurality of phases—i.e. having at least one winding for each phase) where multiple winding phase currents are acquired representing a measure of the current drawn or supplied in each phase. With this in mind, the operating temperature may be estimated, and the value of the reliability parameter may be determined per winding phase and/or for a combination of two or more of the winding phases, for each winding phase or combination of winding phases the measure of the current being a measure of the current drawn or supplied by that winding phase or combination of winding phases.

Figure 2B:
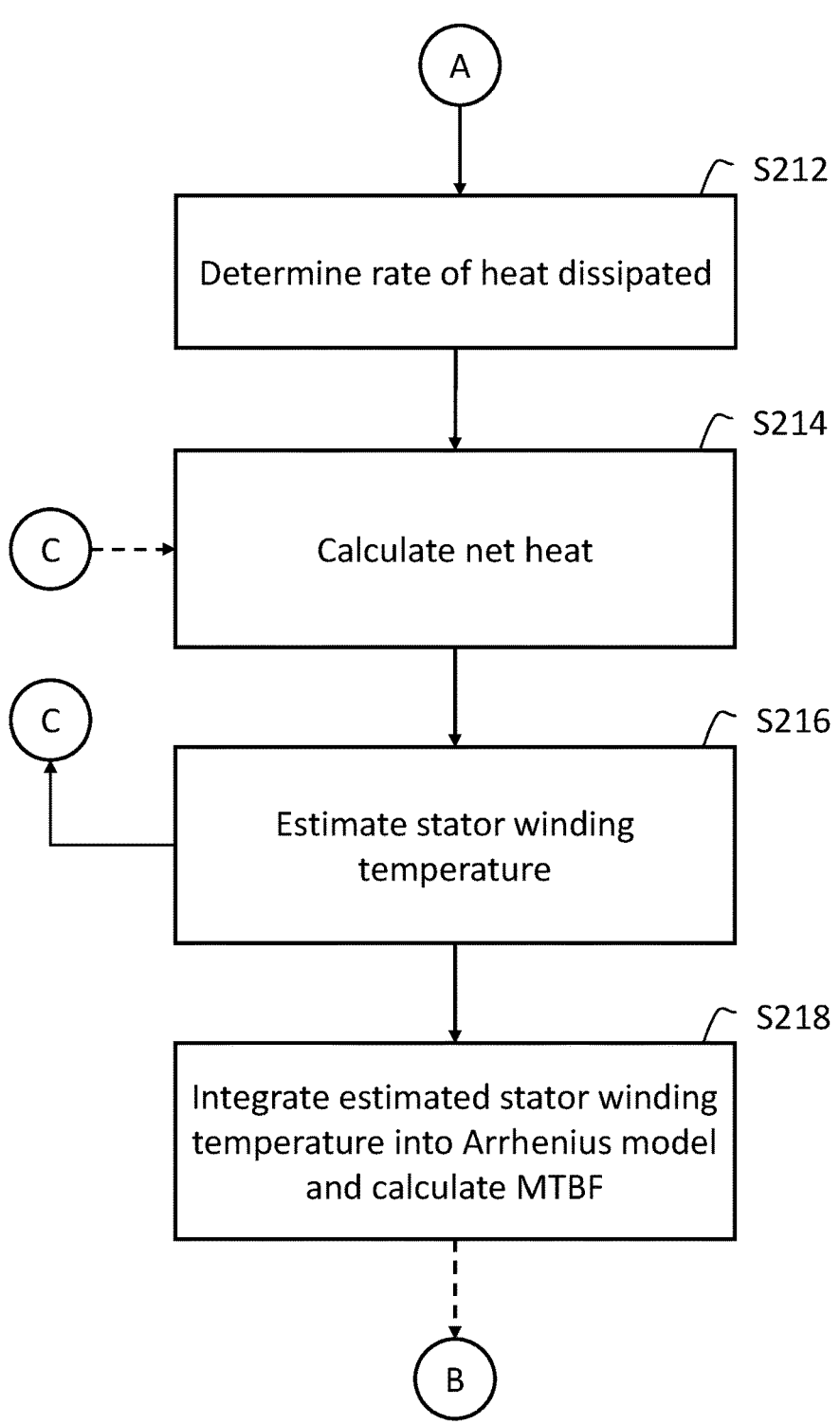
Figure 2C:
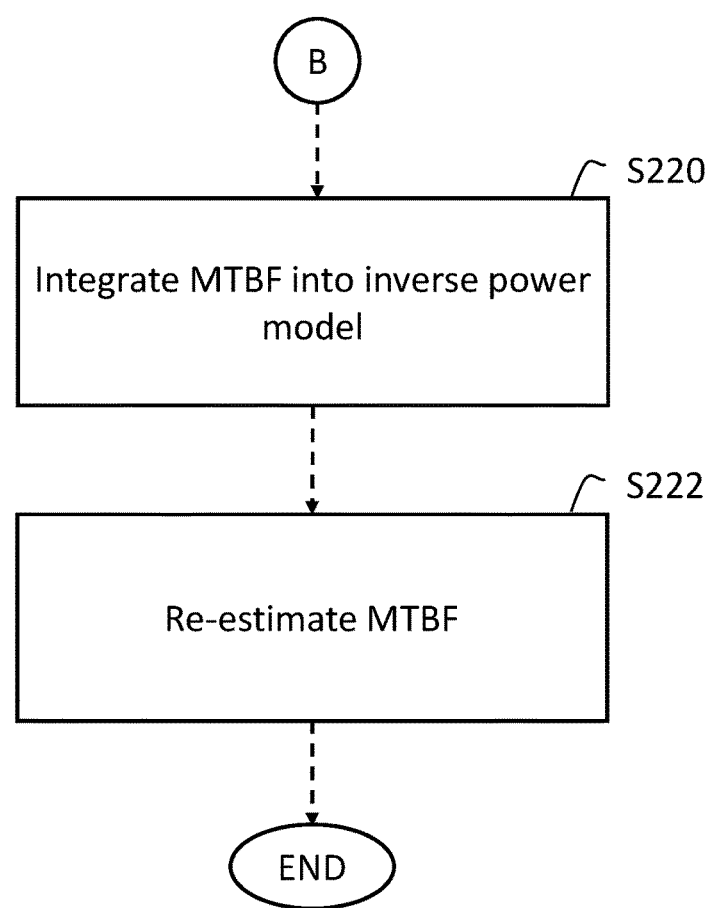

The above-mentioned specific example will now be considered, with reference to a method 200, as a detailed implementation of method 100. FIGS. 2A to 2C are flow charts showing the steps of method 200.

In method 200, the electrical machine is assumed to be a multiphase motor, with a stator, and a plurality of stator windings, and the operating temperature is assumed to be the stator winding temperature. Reference will therefore be made to such components and properties in the description of method 200.

It should be understood that other electrical machines may have different components, but which may be likened to the components referenced in the description of method 200, and the method may be adapted accordingly.

In step S202, the stator winding phase currents, ambient temperature and stator surface temperature are acquired.

In this example, the electrical machine has a plurality of phases, each with at least one associated winding and a phase current. The measures of current drawn by the motor are the stator winding phase currents, which are themselves phase currents drawn by the stator windings.

The ambient temperature may be the temperature of the surrounding environment before the motor starts to operate and may be acquired from an existing ambient temperature sensor located inside or outside of a motor housing. The stator surface temperature is the temperature of the stator surface and may be acquired from an existing stator surface temperature sensor. In this example, the ambient temperature and the stator surface temperature are acquired from existing temperature sensors.

In step S204, the harmonic frequencies of the stator winding phase currents are determined. The harmonic frequencies are determined by calculating a frequency spectrum based on the stator winding phase currents. In this example, a Fourier transform is performed on the stator winding phase currents using an FFT method. Each stator winding phase current may have one or more harmonic frequencies that can be identified from the frequency spectrum. As such, the following analysis may be carried out on a per-phase basis, or in respect of the phases in combination. In the following, an identified or known harmonic frequency may be, or be replaced by, a fundamental frequency or characteristic fault frequency (or, more generally, a frequency of interest).

Method 200 comprises determining power losses of at least a part of the electrical machine, and estimating the operating temperature based on the power losses. At least one of the power losses is determined based on the measure of the current drawn.

In step S206, a magnetic loss is determined. The magnetic loss may be calculated based on machine constants, a magnetic flux density, and a particular determined harmonic frequency (determined from the stator winding phase currents, or pre-known, as above). The magnetic loss may generally be given as:

$$P_{fe-h} = \left(K_h * \left(1/f_h\right) + K_e\right) * B_{mh}^2$$

where $P_{fe-h}$ is the magnetic loss (W) associated with the particular determined harmonic frequency, $K_h$ and $K_e$ are machine constants, $f_h$ is the particular determined harmonic frequency (Hz) and $B_{mh}$ is the maximum flux density (T) of the generated stator magnetic field associated with the particular determined harmonic frequency. $K_h$ and $K_e$ are hysteresis and eddy-current constants, respectively.

In step S208, a resistive loss is determined. The resistive loss may be based on a series resistance in the motor, a rotor resistance, and an amplitude of the current at the particular determined harmonic frequency. The resistive loss may generally be given as:

$$P_{cu-h} = (R_s + R_{hr}) * I_h^2$$

where $P_{cu-h}$ is the resistive loss (W), $R_s$ is the series resistance ($\Omega$) in the motor, $R_{hr}$ is the rotor resistance ($\Omega$) and $I_h$ is the amplitude of the current (Amps) at the particular determined harmonic frequency, or the sum or average of the amplitudes of the currents (Amps) at the particular determined harmonic frequency. In a permanent magnet machine, the rotor resistance $R_{hr}$ may be neglected, or set equal to 0.

In step S210, a total loss is determined. The total loss is the sum of the previously-determined losses, which in this example is the sum of the magnetic loss and the resistive loss. As mentioned earlier, in other examples only one of these losses may be considered, and indeed one or more of these or other losses may be considered.

The total loss in the present example may generally be given as:

$$P = P_{fe-h} + P_{cu-h}$$

based on the definitions of magnetic and resistive loss above.

The total loss (a measure of power) is used as an estimation of the rate of heat generated in the electrical machine. However, some heat that is generated by the losses is lost to the environment and so does not contribute towards the heat causing a change in temperature in the stator windings.

At step S212, a rate of heat dissipated is determined. Determining the rate of heat dissipated may be based on the temperature of the stator surface, a previous estimate of the stator winding temperature (estimated using method 100 or 200), an ambient temperature, and properties of the at least one part of the electrical machine.

The rate of heat dissipated may be calculated using equations describing different types of heat transfer within the motor. In this example, conduction and convection are considered, and may generally be given as:

$$Q = K/d * (T_s - T_w) + hA \, (T_w - T_a)$$

where Q is the rate of dissipated heat (W), K is the thermal conductivity of the stator winding (W/mK), d is a diameter of the wire (e.g. copper wire) used in the windings, $T_s$ is the stator surface temperature (K), $T_w$ is the stator winding temperature (K), $T_a$ is the ambient temperature (K), h is the convective heat transfer coefficient of the winding (W/m²K), and A is the contact area (m²).

Other types of heat transfer, such as radiant heat, may also be used as components of the rate of heat dissipated, and may be implemented using appropriate equations.

If the stator winding temperature has not been previously estimated, the ambient temperature may be used in its place, at least initially. Once the stator winding temperature has been estimated (following steps S214 and S216 of method 200), the preceding stator winding temperature may be used in future calculations of net heat.

At step S214, the net heat in the motor is calculated. The net heat is calculated based on a difference between the determined total loss and the rate of heat dissipated, over a period of time, and may generally be given as:

$$Q_{net} = (P - Q) * t_{step}$$

where $Q_{net}$ is the net heat (J), P is the total loss (W), Q is the rate of dissipated heat (W), and $t_{step}$ is the period of time (s). The total loss may be considered a rate of heat generated, and the net heat is measured as a quantity of energy (a product of net power and time).

Time period $t_{step}$, may be an adjustable or predetermined period of time in which a quantity of net heat (energy) is determined, and may represent a period of time between consecutive or iterative calculations of net heat. That is, $t_{step}$ may represent a period of time that has passed between a preceding time step t−1 and a current time step t, where t is the number of time steps, time steps t and t−1 therefore being separated by the time period $t_{step}$.

Method 200 is an iterative method (indicated by the arrow from step S216 to S214), and the net heat and stator winding temperature are re-calculated after every time period $t_{step}$. For example, a first calculation of net heat takes place at preceding time step t−1 upon which a first estimation of stator winding temperature is based, time period $t_{step}$ passes, and a second calculation of net heat takes place at time step t upon which a second estimation of stator winding temperature is based.

In some arrangements, the iteration may involve returning from step S216 to e.g. S202 or S204 to take into account changing currents. For example, the method 200 may determine whether there has been a substantial change to the current drawn or supplied within the previous time step. When there has been a substantial change, the method 200 may return to/iterate back to step S202 to determine a new drawn or supplied current or currents. Where there has not been a substantial change, the method 200 may return to/iterate back to step S214 to determine a new net heat, without recalculating losses, heat dissipated etc. which will be substantially the same where the current drawn or supplied is substantially the same.

Of course, $t_{step}$ could be any time period set or adjusted by the user depending on how frequently the stator winding temperature should be determined. A time period $t_{step}$ may be selected to provide a balance between a frequency of net heat calculation and computational power requirements, and may be between 1 and 1000 milliseconds, between 1 and 60 seconds, or between 1 and 60 minutes, inclusive. For example, $t_{step}$ may be 15 minutes.

In step S216, the stator winding temperature is estimated based on the specific heat capacity of the material of the stator winding, and a change in the stator winding temperature since the stator winding temperature was last estimated.

A change in the stator winding temperature can be derived from the following equation:

$$Q_{net} = C_p * \Delta T(t)$$

where $Q_{net}$ is the net heat in the motor (as calculated in step S214), $C_p$ is the specific heat capacity of the stator winding material, and $\Delta T(t)$ is the change in stator winding temperature at time t, where t is the time step number as above. The change in stator winding temperature at time step t is the difference in stator winding temperature between time step t−1 and time step t, or the stator winding temperature change within the most recent time period $t_{step}$.

Therefore, based on the equation above, the change in stator winding temperature over the preceding time period $t_{step}$ at time step t may generally be given as:

$$\Delta T(t) = Q_{net}/C_p$$

The change in stator winding temperature at time step t may be described as the net energy generated since the previous estimation of stator winding temperature divided by the specific heat capacity of the material in which the heat is generated. The specific heat capacity is the energy required to raise the temperature of 1 unit mass of the material by 1 degree (K).

The change in stator winding temperature at time step t may then be added to the preceding stator winding temperature (estimated at time step t−1) in order to calculate a new stator winding temperature (at time step t).

If the stator winding temperature has not been previously estimated (i.e., when the machine is initially started/at machine startup, or at the start of method 200), the ambient temperature may be used in its place. In this case, the estimated stator winding temperature may generally be given as:

$$T_w(t) = T_a + \Delta T(t)$$

where $T_w(t)$ is the estimated stator winding temperature at time step t, $T_a$ is the ambient temperature, and $\Delta T(t)$ is the change in stator winding temperature (since the preceding time step) at time step t.

If the stator winding temperature has been previously estimated, the current estimated stator winding temperature may be calculated using the previously estimated stator winding temperature. In this case, the stator winding temperature may generally be given as:

$$T_w(t) = T_w(t-1) + \Delta T(t)$$

where $T_w(t)$ is the estimated stator winding temperature at time step t, $T_w(t-1)$ is the previously estimated operating temperature at preceding time step t−1, and $\Delta T(t)$ is the change in stator winding temperature (since the preceding time step) at time step t.

In step S218, the estimated stator winding temperature is integrated into the Arrhenius model (as an example temperature-based model) to determine the MTBF as a function of temperature. MTBF as a function of temperature may generally be given as:

$$\eta_t = A * e^{(-\Delta E/k*Tw)}$$

where $\eta_t$ is the MTBF as a function of temperature, A is a pre-exponential factor, e is the exponential constant, $\Delta E$ is the activation energy of the material of the stator windings, k is the Boltzmann constant, and $T_w$ is the estimated stator winding temperature. The MTBF as a function of temperature may be calculated initially at the rated condition or rated power of the electrical machine.

In step S220, once the MTBF as a function of temperature has been determined, with the motor operating at its rated operating power, it can be substituted into an inverse power model which may generally be given as:

$$\eta_t = A * P^{(-c)}$$

where $\eta_t$ is the MTBF as a function of temperature, A is a pre-exponential factor, P is the operating power of the motor, and c is a constant. A may be the same value as A in step 218, or may be a different value. Using the determined MTBF from step S218, and using the rated operating power of the motor, the inverse power model can be rearranged to determine the constant c, as generally given below:

$$c = -\log_P(\eta_t/A)$$

At step S222, once c has been determined in this way, MTBF values may be re-estimated (or new MTBF values may be estimated) using the inverse power model for different operating powers, this time to give MTBF values as a function of power:

$$\eta_p = A * P^{(-c)}$$

where $\eta_p$ is the MTBF as a function of power (i.e. operating power), A is the pre-exponential factor, P is the operating power of the motor, and c is the constant whose value was derived above.

These new MTBF values as a function of power may indicate, for example, the MTBF if the motor was to experience power fluctuations (or be operated at a power level) above or below the rated operating power. It may then be possible to plot MTBF vs operating power to optimize, or simply change, the estimated MTBF, or to plan maintenance routines based on levels of operating power employed.

A temperature-based MTBF may be determined based on the Arrhenius equation at the rated condition, and this temperature-based MTBF may be used to determine a value of the constant c, at the rated condition, for use in the inverse power model.

When operating conditions change (for example, when the motor speeds up), the measure of current drawn or supplied changes accordingly, and the effect of the change in operating conditions is accounted for in the Arrhenius equation through the use of the estimated temperature (itself being derived from the current). The new load or power level associated with the change in operating conditions can then be incorporated into the inverse power model using parameter P to determine a power-based MTBF.

Optionally, the values of MTBF determined from steps S218 and S222 (i.e., the first value of the reliability parameter and the second value of the reliability parameter, or the temperature-based MTBF and the power-based MTBF) may be multiplied together (or combined in another way, such as by averaging) to determine a combined MTBF prediction (i.e., a combined value, or third value, of the reliability parameter) which accounts for both the thermal and electrical operating conditions of the electrical machine.

Steps S202 to S222 can therefore be used to determine the MTBF of an electrical machine in real-time, considering both the thermal and electrical stresses, by using available stator winding currents, an ambient temperature and stator surface temperature measurements, which may be available from existing system sensors. As such, the method may be implemented while the machine is online.

The above methods may be partly or fully computer-implemented, and thus be considered computer-implemented methods. The methods may be implemented on computing apparatus, or a group of computing apparatuses, configured to receive a measure of a current drawn by the electrical machine and carry out any of the methods described herein.

Figure 3:
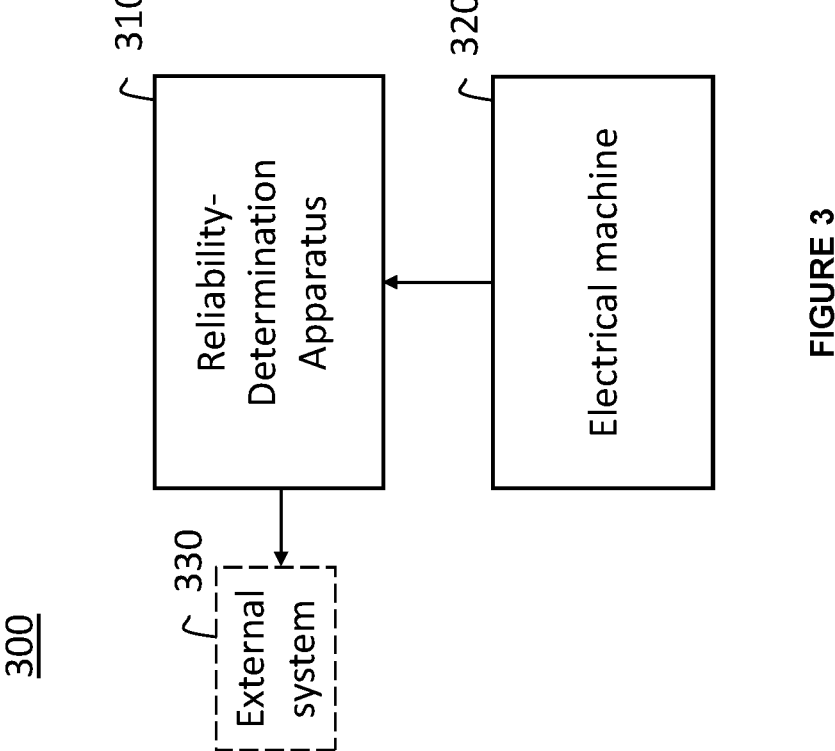
FIG. 3 is a schematic diagram of a system comprising reliability-determination apparatus and an electrical machine.

FIG. 3 is a schematic diagram of a system 300, comprising reliability-determination apparatus 310 and electrical machine 320. Reliability-determination apparatus 310 may be configured to implement any of the methods disclosed herein, for example method 100 or 200. Reliability-determination apparatus 310 may be implemented in software or in hardware or in any combination thereof, and may for example be implemented as computing apparatus having one or more processors configured to execute a computer program.

The apparatus 310 may comprise sensors to perform measurements of current drawn or supplied based on electrical signals received from the electrical machine, or may receive the measure of the current drawn or supplied from the electrical machine 320 itself, with the electrical machine 320 generating the measure based on its own sensors. The apparatus 310 may be configured to output the determined reliability parameter value to an optional external system 330 such that the external system 330 may make decisions based on the reliability parameter, or use the reliability parameter value as a control parameter (e.g., to control the electrical machine or another system).

The electrical machine 320 may for example be a motor which is part of an engine, e.g., of an aircraft. In such a case, the signals received by the apparatus 310 from the electrical machine 320 may be received from the engine.

Figure 4:
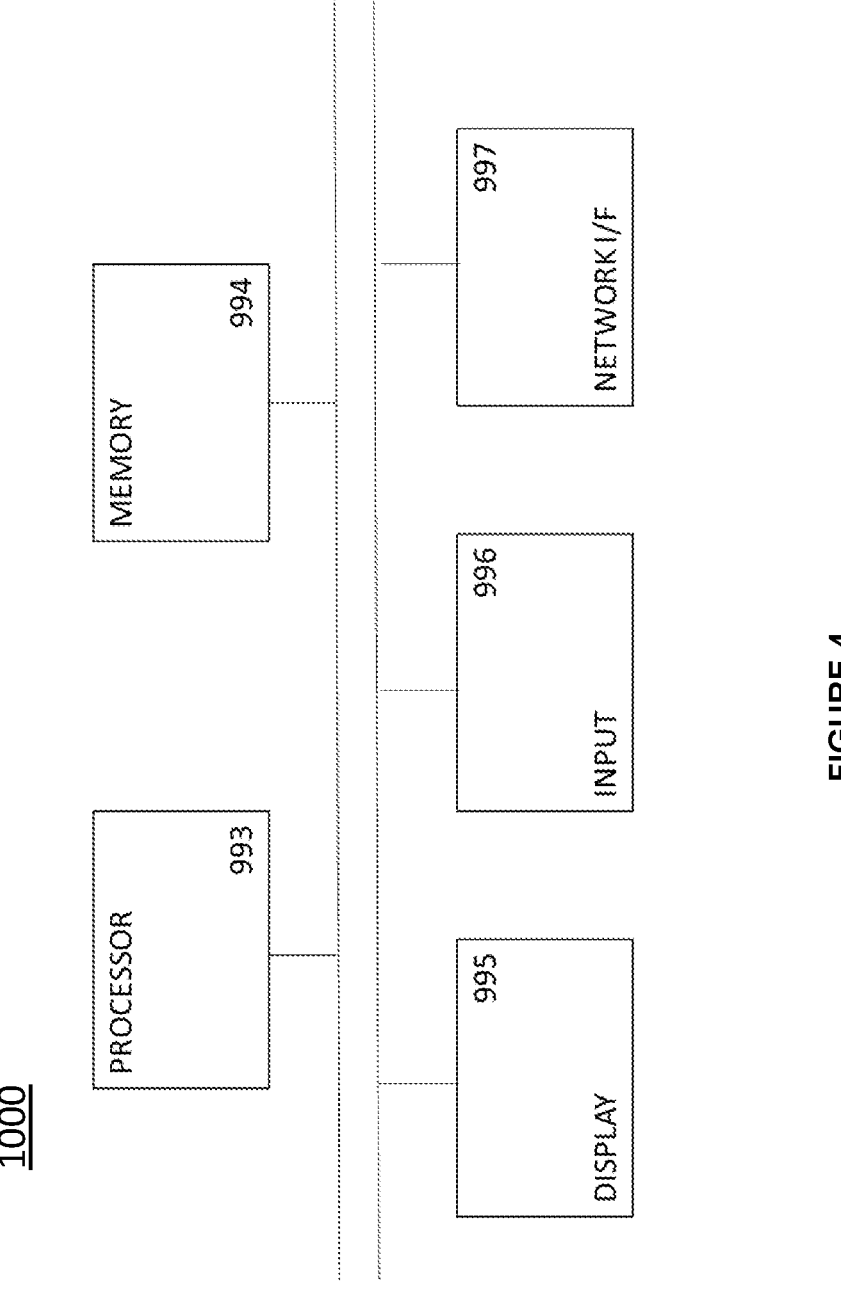
FIG. 4 is a schematic diagram of a computing device which may serve to implement the reliability-determination apparatus of FIG. 3.

FIG. 4 is a block diagram of a computing device 1000, which may serve to implement the reliability-determination apparatus 310, and thus which may be used to implement any of the methods of the present disclosure, for example method 100 or 200.

The computing device 1000 comprises a processor 993, and memory, 994. Optionally, the computing device also includes a network interface 997 for communication with other computing devices, for example with other computing devices of invention embodiments. For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general-purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various methods described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The reliability-determination apparatus 310 of FIG. 3 may thus be a processor 993 (or plurality thereof) executing processing instructions (a program) stored on a memory 994 and exchanging data via a network I/F 997. In particular, the processor 993 may execute processing instructions to receive, via the network I/F, data or signals from the electrical machine 320. Furthermore, the processor 993 may execute processing instructions to store reliability parameters on a connected storage unit and/or to transmit, via the network I/F 997, reliability parameters to the external system 330 for processing.

In any of the above aspects, the various features may be implemented in hardware, or as software modules running on one or more processors/computers.

The invention also provides a computer program or a computer program product comprising instructions which, when executed by a computer, cause the computer to carry out any of the methods/method steps described herein, and a non-transitory computer-readable medium comprising instructions which, when executed by a computer, cause the computer to carry out any of the methods/method steps described herein. A computer program embodying the invention may be stored on a non-transitory computer-readable medium, or it could, for example, be in the form of a signal such as a downloadable data signal provided from an Internet website, or it could be in any other form.

We claim:

1. A computer-implemented method of determining a value of a reliability parameter of an electrical machine, the method comprising:

estimating an operating temperature of at least a part of the electrical machine based on a measure of a current drawn or supplied by the electrical machine, wherein the operating temperature is estimated iteratively every predetermined time period;

determining the value of the reliability parameter using the estimated operating temperature as an input to a temperature-based Arrhenius model of the electrical machine which defines the reliability parameter as a function of the estimated operating temperature;

determining a first value of the reliability parameter using the estimated operating temperature as an input to the Arrhenius model with the electrical machine operating at a given operating power level;

employing the first value of the reliability parameter, the given operating power level, and a power-based model of the electrical machine, which defines the reliability parameter as a function of the operating power level and a constant, to derive a value of the constant; and employing the power-based model, the derived value of the constant and a different operating power level to iteratively derive a second value of the reliability parameter corresponding to the different operating power level.

2. The method of claim 1, wherein the reliability parameter is:

a mean time between failure, MTBF; or a mean time to failure, MTTF; or an expected up-time; or an expected lifetime.

3. The method of claim 1, wherein the electrical machine is a rotating electrical machine, optionally wherein the electrical machine is a motor or generator.

4. The method of claim 1, wherein:

the current is drawn or supplied by a winding of the electrical machine; and/or the operating temperature is the temperature of a winding of the electrical machine.

5. The method of claim 1, further comprising:

measuring the current, and using the measured current as the measure of the current; or deriving the current based on a measure of an impedance of the electrical machine and a potential difference or voltage across the impedance, optionally wherein the method comprises:

measuring said potential difference or voltage; and/or measuring said impedance, or acquiring a known value of said impedance.

6. The method of claim 1, further comprising:

determining one or more power losses of at least a part of the electrical machine, and/or determining a rate of dissipated heat, being a rate of heat dissipated by at least a part of the electrical machine; and estimating the operating temperature based on the one or more power losses and/or the rate of dissipated heat, optionally wherein:

the method further comprises determining the one or more power losses based on the measure of the current; and/or the one or more power losses comprise at least one of a resistive loss, such as a winding loss, and a magnetic loss, such as a core loss.

7. The method of claim 6, further comprising estimating the operating temperature based on a difference between the one or more power losses of the electrical machine and the rate of dissipated heat.

8. The method of claim 6, further comprising successively estimating the operating temperature, each successive estimate of the operating temperature comprising a sum of the preceding estimate of the operating temperature and an estimate of a change in the operating temperature since the preceding estimate of the operating temperature, and optionally, estimating the change in the operating temperature since the preceding estimate of the operating temperature based on the one or more determined power losses and/or the determined rate of dissipated heat, optionally based on a difference between the one or more power losses of the electrical machine and the rate of dissipated heat.

9. The method of any of claim 6, further comprising determining the one or more power losses based on a frequency spectrum of the measure of the current.

10. The method of claim 9, further comprising calculating the frequency spectrum based on the measure of the current, optionally by Fourier transform and optionally using an FFT method.

11. The method of claim 10, further comprising determining the one or more power losses based on at least one harmonic frequency, fundamental frequency or characteristic fault frequency in the frequency spectrum and/or a magnitude of the frequency spectrum at the at least one harmonic frequency, fundamental frequency or characteristic fault frequency, the method optionally further comprising analyzing the frequency spectrum to identify the at least one harmonic frequency, fundamental frequency or characteristic fault frequency.

12. The method of claim 6, further comprising determining the rate of dissipated heat based on a temperature of a stator surface of the electrical machine and an existing estimate of the operating temperature.

13. The method of claim 1, wherein:

the electrical machine has a multiphase winding;

the method comprises estimating the operating temperature and determining the value of the reliability parameter per winding phase and/or for a combination of two or more of the winding phases; and for each winding phase or combination of winding phases the measure of the current is a measure of the current drawn or supplied by that winding phase or combination of winding phases.

14. A reliability-determination apparatus for determining a value of a reliability parameter of an electrical machine, the reliability-determination apparatus configured to:

receive a measure of a current drawn or supplied by the electrical machine; and carry out the method of claim 1.

15. A non-transitory computer-readable medium having a computer program stored thereon that, when executed by a computer, causes the computer to carry out the method of claim 1.

* * * * *